United States Patent [19]

Wöhler

[11] Patent Number: 5,249,781
[45] Date of Patent: Oct. 5, 1993

[54] SUPPORT FOR A COIL SPRING

[75] Inventor: Hans-Jürgen Wöhler, Stuttgart, Fed. Rep. of Germany

[73] Assignee: Dr. Ing. h.c.F. Porsche AG, Fed. Rep. of Germany

[21] Appl. No.: 833,669

[22] Filed: Feb. 11, 1992

[30] Foreign Application Priority Data

Feb. 16, 1991 [DE] Fed. Rep. of Germany ....... 4104859

[51] Int. Cl.⁵ ............................................. B60G 15/02
[52] U.S. Cl. ...................................... 267/33; 267/170
[58] Field of Search ................ 267/33, 219, 220, 221, 267/292, 140.1, 170; 280/668

[56] References Cited

U.S. PATENT DOCUMENTS

| 3,051,469 | 8/1962 | Boschi | 267/33 |
| 4,699,530 | 10/1987 | Satoh et al. | 280/668 X |
| 4,721,325 | 1/1988 | Mackevjalo et al. | 280/668 |

FOREIGN PATENT DOCUMENTS

| 0046508 | 3/1982 | European Pat. Off. | |
| 2504202 | 8/1975 | Fed. Rep. of Germany | |
| 2942135 | 4/1981 | Fed. Rep. of Germany | |
| 3620774 | 1/1987 | Fed. Rep. of Germany | 280/668 |
| 3532681 | 3/1987 | Fed. Rep. of Germany | |
| 1341188 | 9/1963 | France | 267/221 |
| 34537 | 2/1985 | Japan | 267/170 |
| WO89/05242 | 6/1989 | PCT Int'l Appl. | |
| 2026131 | 1/1980 | United Kingdom | |

OTHER PUBLICATIONS

Revue Technique Automobile, Bd. 30, No. 346, Jun. 1975, Seite 58; 'Suspension'.

Primary Examiner—Robert J. Oberleitner
Assistant Examiner—Kevin D. Rutherford
Attorney, Agent, or Firm—Evenson, McKeown, Edwards & Lenahan

[57] ABSTRACT

A support for a coil spring of a spring strut of a motor vehicle, which is cardanically disposed on the vehicle body, comprises a coil spring which, on one side, on the side of the vehicle body, is supported on an upper first elastic spring pocket and, on the other side, is supported by way of another lower second spring pocket which is stationarily held on the spring strut. In the operating direction of the coil spring, the upper spring pocket has areas of different elastic characteristics. In an area of high axial pressure forces of the compressed coil spring, the elastic characteristic of the spring pocket is less than in an opposite area of the spring pocket of lower axial pressure forces of the compressed coil spring. By means of this development of the spring pocket, a disadvantageous bulging of the coil spring during compression and rebounding movements is largely prevented.

12 Claims, 3 Drawing Sheets

SUPPORT FOR A COIL SPRING

BACKGROUND AND SUMMARY OF THE INVENTION

This invention relates to a support for a coil cardanically disposed on the vehicle body.

Wheel suspensions for springs struts are known (German Patent Document DE-A 35 32 681) which are supported on the wheel suspension link or on the wheel carrier and have a coaxially arranged coil spring. This coil spring is held in a vehicle-body-side first elastic spring pocket (German Patent Document DE-A 29 42 135) and, on the spring strut, is held in a stationary second spring pocket. During compression and rebounding movements of the vehicle wheel, the spring strut will swivel and therefore also the second spring pocket will as a result take up an oblique position which is changed from the parallel position with respect to the first spring pocket. Particularly during compression movements of the wheel, this results in a bulging of the coil spring and therefore in a weakening of its effect a well as in coil contact which leads to noise.

It is an object of the invention to provide an upper support of the coil spring, which is arranged approximately coaxially to the spring strut, in an elastic first spring pocket which largely prevents a bulging of the coil spring during compression and rebounding movements.

According to the invention, this object is achieved by an arrangement comprising:

an upper elastic spring pocket on a side of the vehicle body for supporting a top end of the coil spring, and a lower spring pocket stationarily held on the spring strut for supporting a bottom end of the coil spring, wherein the upper spring pocket is constructed in the axial operating direction of the coil spring with areas of different elastic characteristics.

The principal advantages achieved by means of the invention are that, during the compression and rebounding movements of the spring strut, despite a lower second spring pocket, which is displaced in its position with respect to the upper spring pocket, there is not significant bulging of the coil spring. This is advantageously achieved by means of a spring pocket which in certain areas is held in an elastically targeted manner. This elasticity is provided in the area of relatively high pressure forces of the coil spring so that the spring, virtually with its first coil, comes to rest in parallel to the lower second spring pocket.

The different elastic characteristics provided in the spring pocket are achieved in a simple manner by recesses in the spring pocket. These are preferably provided in the contact surface to the vehicle body and below the screw coil.

The recesses may consist of slot-type, pocket-shaped indentations but may also have other geometric shapes, such as a circular shape or similar shapes. They preferably extend on a circular path, and their longitudinal axes are arranged to be extending radially with respect to the center of the spring pocket.

For the exact fixing of the coil spring, radial slots are provided which start out from the internal bore and are arranged to correspond with heads of fastening screws and reach around them.

Other objects, advantages and novel features of the present invention will become apparent from the following detailed description of the invention when considered in conjunction with the accompanying drawings.

DETAILED DESCRIPTION OF THE DRAWINGS

Figure 1:
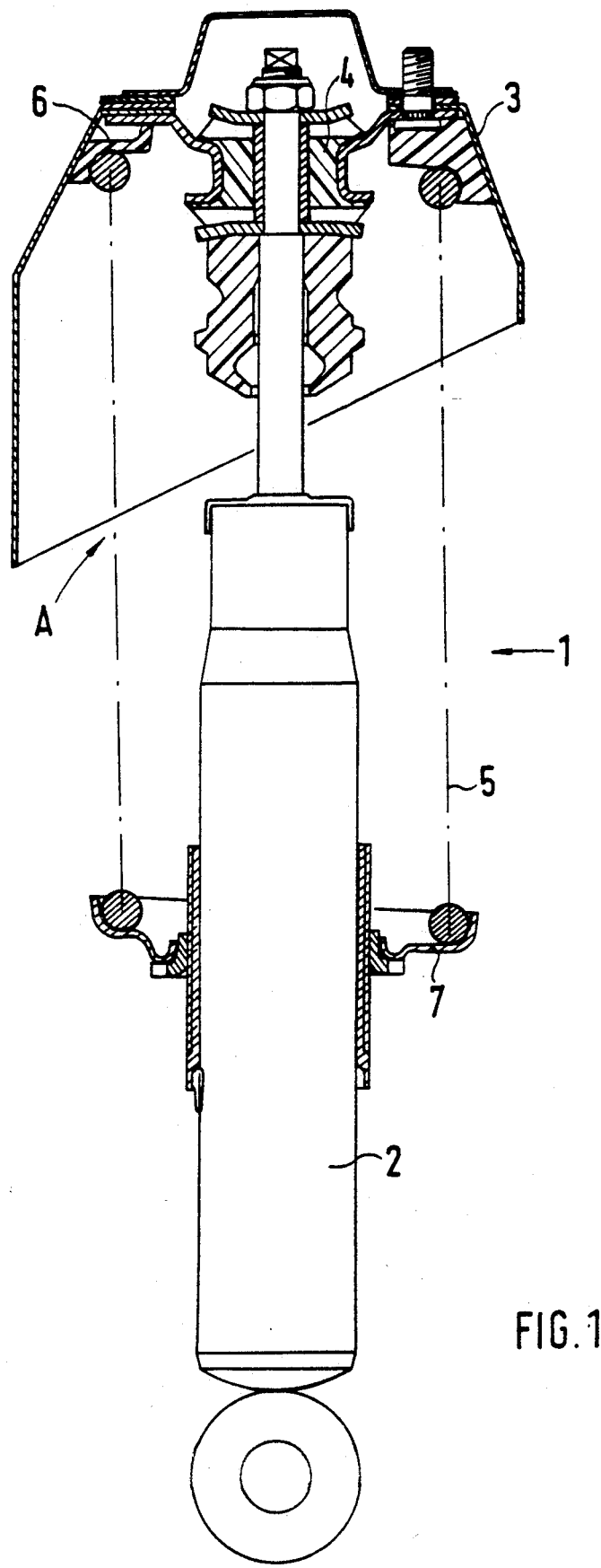
FIG. 1 is a view of a shock absorber strut with a coaxially arranged coil spring which is supported on spring pockets, constructed according to a preferred embodiment of the invention.

A shock absorber 1 comprises essentially a spring strut 2 which, on one side, is cardanically movably held on the vehicle body 3 in an elastic element 4 and, on the other side, with its opposite end, is connected with a wheel carrier or with a wheel suspension link. A coil spring 5 is arranged to surround the spring strut 2 and is supported in a first upper elastic spring pocket 6 on the vehicle body 4 and by way of a second spring pocket 7 fastened to the spring strut 2.

Figure 2:
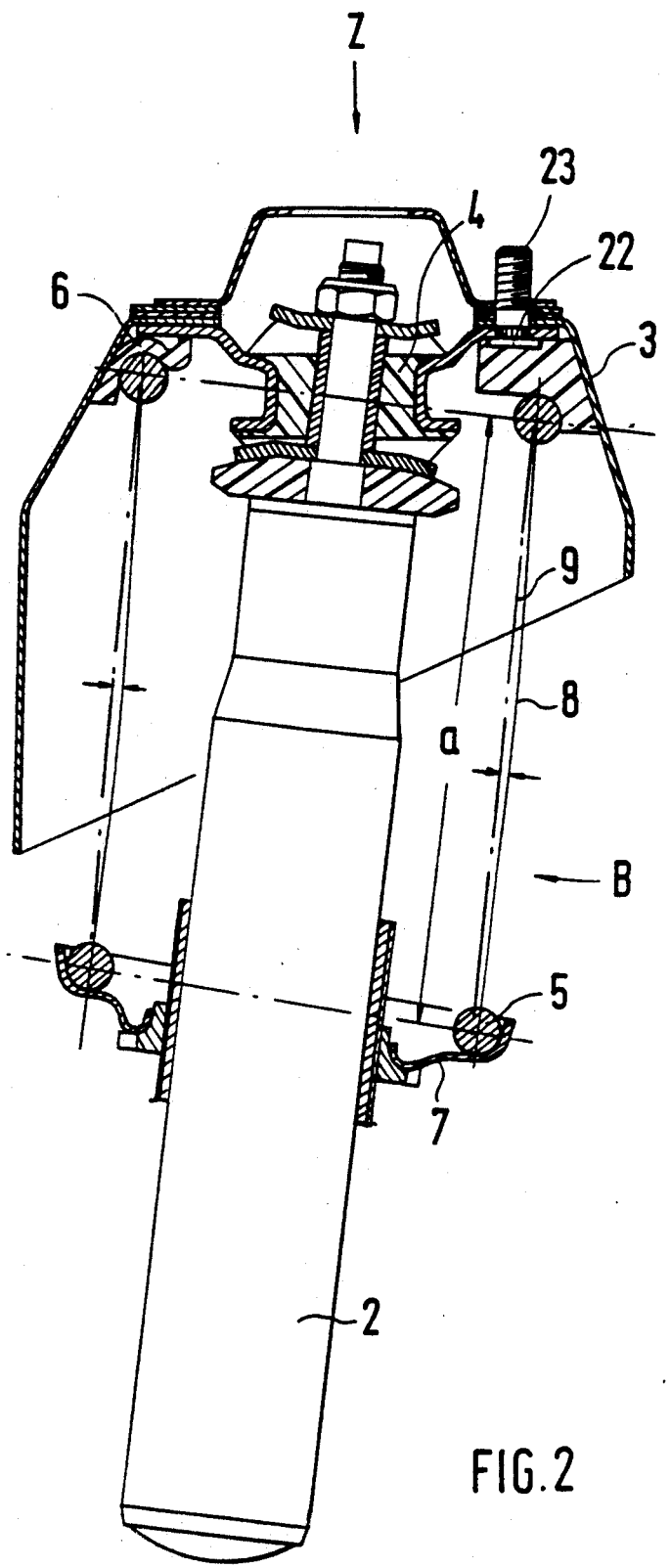
FIG. 2 is a view of the shock absorber strut of FIG. 1 with the coil spring in the compressed position.
Figure 3:
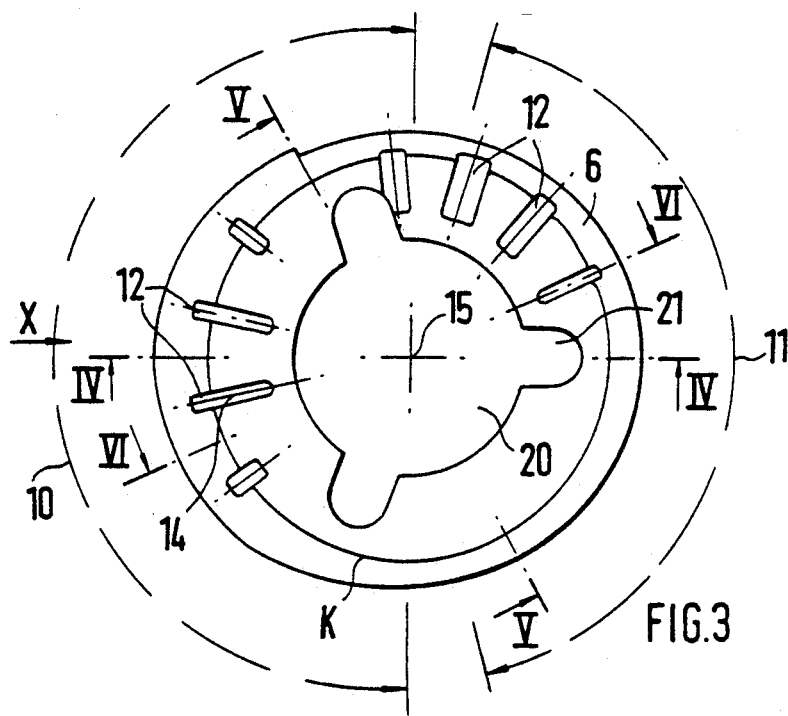
FIG. 3 is a top view in the direction of the arrow Z of FIG. 2 of the upper spring pocket.
Figure 7:
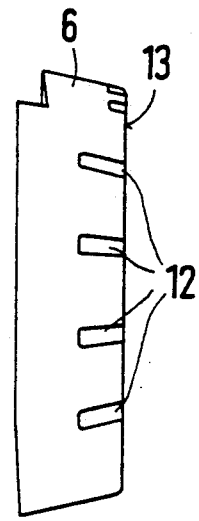
FIG. 7 is a view of the spring pocket in the direction of the arrow X of FIG. 3.
Figure 4:
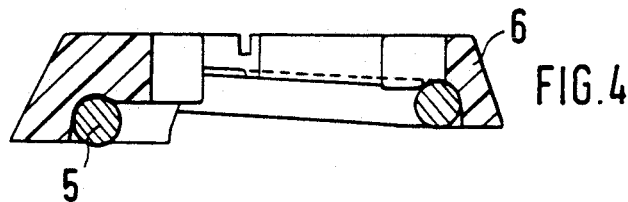
FIG. 4 is a sectional view taken along Line IV—IV of the upper spring pocket according to FIG. 3.
Figure 5:
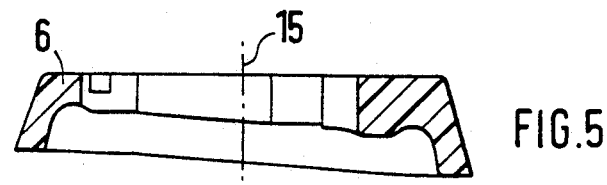
FIG. 5 is a sectional view taken along Line V—V of FIG. 3.
Figure 6:
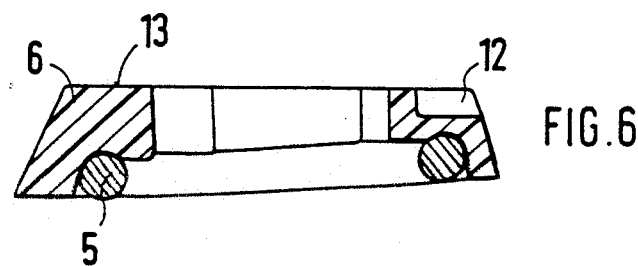
FIG. 6 is a sectional view taken along Line VI—VI of FIG. 3.

As illustrated in detail in FIG. 1, the two spring pockets 6 and 7 in the inoperative position A are arranged approximately in parallel to one another. During a compression event (Position B of FIG. 2), the lower spring pocket 7 is displaced with respect to the upper spring pocket 6, and the coil spring 5, which is clamped in between these spring pockets 6 and 7 and is compressed, bulges in the direction of the larger axial distance a (FIG. 2) between the spring pockets 6 and 7, as the contour 8 shows with respect to the cylindrical contour 9 of the coil spring 5 and as indicated by the arrows.

So that approximately the condition of parallel spring pockets 6 and 7 can be reestablished, the upper spring pocket 6 is constructed with an area 10 of higher elasticity than an adjacent area 11; that is, the area 10 is constructed to b softer in the axial operating direction of the coil spring 5 than the diametrically opposite area 11.

The upper spring pocket 6 has the softer area 10 on the side on which the coil spring 5 absorbs higher axial pressure forces so that this side can stretch and the bulging is counteracted. For this purpose, the spring pocket 6 is provided with several recesses 12. These are arranged in the surface 13 of the spring pocket 6 which faces the contact surface of the vehicle body 3.

The recesses 12 are preferably designed in the manner of slots and form so-called pockets which extend with their longitudinal axes 14 to the center 15 of the spring pocket 7. They are preferably spaced with respect to one another and are molded in on a circular path.

In the illustrated embodiment, the recesses 12 extend along an area of approximately 180°. This course may be smaller—thus, less than 180°, but also larger, that is, above 180°. It is a function of the circumstances of the wheel suspension; that is, of the position of the lower spring pocket 7 with respect to the upper spring pocket 6 during compression and rebounding movements, and is also a function of the stroke of the compression movement of the shock absorber 1.

The recesses 12 in the embodiment are designed to be slot-shaped; however, other geometric shapes may also be selected for these recesses.

In order to fix the position of the spring pocket 6 with respect to the coil spring 5, the spring pocket 6 has open slots 21 which lead from the receiving bore 20 radially toward the outside and are disposed opposite the heads 22 of fastening screws 23 and reach around them.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A support for a coil spring of a spring strut of a motor vehicle which is cardanically disposed on a vehicle body, comprising:

an upper elastic spring pocket on a side of the vehicle body for supporting a top end of the coil spring, and a lower spring pocket stationarily held on the spring strut for supporting a bottom end of the coil spring, wherein the upper elastic spring pocket has several variable size recesses in its area facing a vehicle body wall which contributes to different elastic characteristics in the axial operating direction of the coil spring over the surface of the upper elastic spring picket, whereby bulging of the coil spring during compression and rebounding of the coil spring in use are limited.

2. A support according to claim 1, wherein the recesses are configured such that the elastic characteristic of the upper spring pocket in an area of high axial pressure forces of the compressed coil spring is less than in an opposite area of the spring pocket of smaller axial pressure forces of the compressed coil spring.

3. A support according to claim 2, wherein the upper spring pocket has fixing slots which extend radially from a receiving bore for the upper end of the coil spring.

4. A support according to claim 1, wherein the recesses are designed in the manner of slots and extend toward the center of the upper spring pocket.

5. A support according to claim 4, wherein the recesses are approximately regularly spaced with respect to one another and extend on a part circular area of approximately 180° of the circumference of the upper spring pocket.

6. A support according to claim 1, wherein the recesses are approximately regularly spaced with respect to one another and extend on a part circular area of approximately 180° of the circumference of the upper spring pocket.

7. A support according to claim 6, wherein the upper spring pocket has fixing slots which extend radially from a receiving bore for the upper end of the coil spring.

8. A support according to claim 1, wherein the recesses are arranged directly adjacent a receiving device for a turn of the coil spring.

9. A support according to claim 1, wherein the upper spring pocket has fixing slots which extend radially from a receiving bore for the upper end of the coil spring.

10. A support according to claim 1, wherein the recesses are designed in the manner of slots and extend toward the center of the upper spring pocket.

11. A support for a coil spring of a spring strut of a motor vehicle which is cardanically disposed on a vehicle body, comprising:

an upper elastic spring pocket on a side of the vehicle body for supporting a top end of the coil spring, and a lower spring pocket stationarily held to the spring strut for supporting a bottom end of the coil spring, wherein the upper spring pocket includes coil spring support areas with different elastic characteristics, and wherein the upper spring pocket has fixing slots which extend radially from a receiving bore for the upper end of the coil spring.

12. A support according to claim 11, wherein the upper spring pocket is configured such that the elastic characteristic of the upper spring pocket in an area of high axial pressure forces of the compressed coil spring is less than in an opposite area of the spring pocket of smaller axial pressure forces of the compressed coil spring.

* * * * *